United States Patent [19]

Trott

[11] Patent Number: 5,417,866
[45] Date of Patent: May 23, 1995

[54] CONTINUOUS FLOW POLYMER FILTRATION APPARATUS AND PROCESS

[75] Inventor: Delano B. Trott, Danvers, Mass.
[73] Assignee: Extek, Inc., Marblehead, Mass.
[21] Appl. No.: 87,215
[22] Filed: Jul. 2, 1993
[51] Int. Cl.⁶ .................. B01D 24/46; B01D 24/00
[52] U.S. Cl. .................... 210/791; 210/236; 210/330; 210/445; 210/447; 210/388; 425/183; 425/185; 425/197
[58] Field of Search ............ 210/791, 330, 341, 171, 210/236, 445, 352, 388, 447, 499; 425/183, 185, 184, 135, 182, 197

[56] References Cited

U.S. PATENT DOCUMENTS

| | | |
|---|---|---|
| 2,786,504 | 3/1957 | Samler . |
| 3,007,199 | 11/1961 | Curtis . |
| 3,059,276 | 10/1962 | Yokana . |
| 3,455,357 | 7/1969 | Zink . |
| 3,501,806 | 3/1970 | Schrader . |
| 3,503,096 | 3/1970 | Marianelli . |
| 3,675,934 | 7/1972 | Heston ................................ 277/12 |
| 3,743,101 | 7/1973 | Schmidt ............................ 210/447 |
| 3,804,758 | 4/1974 | Cooper et al. . |
| 3,856,277 | 12/1974 | Tiramani . |
| 3,856,680 | 12/1974 | Elmore ............................... 210/184 |
| 3,900,399 | 8/1975 | Kreyenborg et al. .............. 210/236 |
| 3,947,202 | 3/1976 | Göller et al. ...................... 425/185 |
| 3,962,092 | 6/1976 | Newman, Jr. ..................... 210/236 |
| 4,025,434 | 5/1977 | Mladota ............................. 210/236 |
| 4,059,525 | 11/1977 | Krasnow ........................... 210/236 |
| 4,082,487 | 4/1978 | Rapp .................................. 425/135 |
| 4,167,384 | 9/1979 | Shirato et al. ..................... 425/183 |
| 4,237,014 | 12/1980 | Trott .................................. 210/330 |
| 4,359,387 | 11/1982 | Trott .................................. 210/352 |
| 4,395,212 | 7/1983 | Lambertus ......................... 425/185 |
| 4,416,605 | 11/1983 | Konno et al. ..................... 425/185 |
| 4,511,472 | 4/1985 | Trott .................................. 210/340 |
| 4,588,502 | 5/1986 | Zibell et al. ....................... 210/171 |
| 4,597,870 | 7/1986 | Lambertus ......................... 210/341 |
| 4,701,118 | 10/1987 | Koching et al. .................. 425/185 |
| 4,725,215 | 2/1988 | Kreyenborg et al. ............. 425/185 |
| 4,752,386 | 6/1988 | Schulz et al. ..................... 210/108 |
| 4,814,186 | 3/1989 | Trott .................................. 425/199 |
| 4,850,840 | 7/1989 | Gneuss .............................. 425/182 |
| 5,004,414 | 4/1991 | Stude et al. ....................... 425/185 |
| 5,090,887 | 2/1992 | Gneuss .............................. 425/185 |
| 5,122,286 | 6/1992 | Kreyenborg et al. ............. 210/791 |
| 5,125,823 | 6/1992 | Kreyenborg ....................... 425/185 |

OTHER PUBLICATIONS

"New Continuous Screen Changer with Larger Filtration Area," *Modern Plastics International*, vol. 9, No. 8, pp. 36–38 (Aug., 1979).
Bessemer, et al., "Continuous Extruder Filtration Enhances Product Quality and Throughput," *Plastics Engineering*, vol. 39, No. 7, pp. 29–31 (Jul. 1983).
"A Better Screen Changer for the 90's," Extek, Inc., (Sep. 1990).
"Manual and Hydraulic Screen Changers," Extek, Inc., (Jul. 1991).
"Polymer Filtration Systems, Continuous Power Prefill Screenchanger," Gemini, (Sep. 1991).
"Beringer Continuous Flow Filtration Systems (CFS)," The Beringer Co., Inc., (Aug. 1989).
"Continuous Double-Plate Screen Changer," AST, (Nov. 1989).
Galli, "Screenchangers Come of Age," PM&E: 26–31 (Jan. 1992).
"SP Series–Slideplate Screenchangers," Conair/Patt, (Oct. 1991).

*Primary Examiner*—Frank Spear
*Assistant Examiner*—Ana M. Fortuna
*Attorney, Agent, or Firm*—Hamilton, Brook, Smith & Reynolds

[57] ABSTRACT

A continuous flow polymer filtration apparatus for replacing dirty filters in an extruder includes a reciprocating slide member secured within a slide channel transverse to a bore. The slide channel has a sealing region adjacent to the bore. The slide member houses two filter assemblies for filtering polymer. Each filter assembly comprises at least one filter element which has a width that is less than the width of the sealing region and the distance between the filter assemblies is less than the width of the bore. The slide member is capable of positioning either filter assembly in line with the bore without interrupting the fluid flow of the polymer as well as positioning either filter assembly off-line in order to replace the off-line filter assembly.

33 Claims, 12 Drawing Sheets

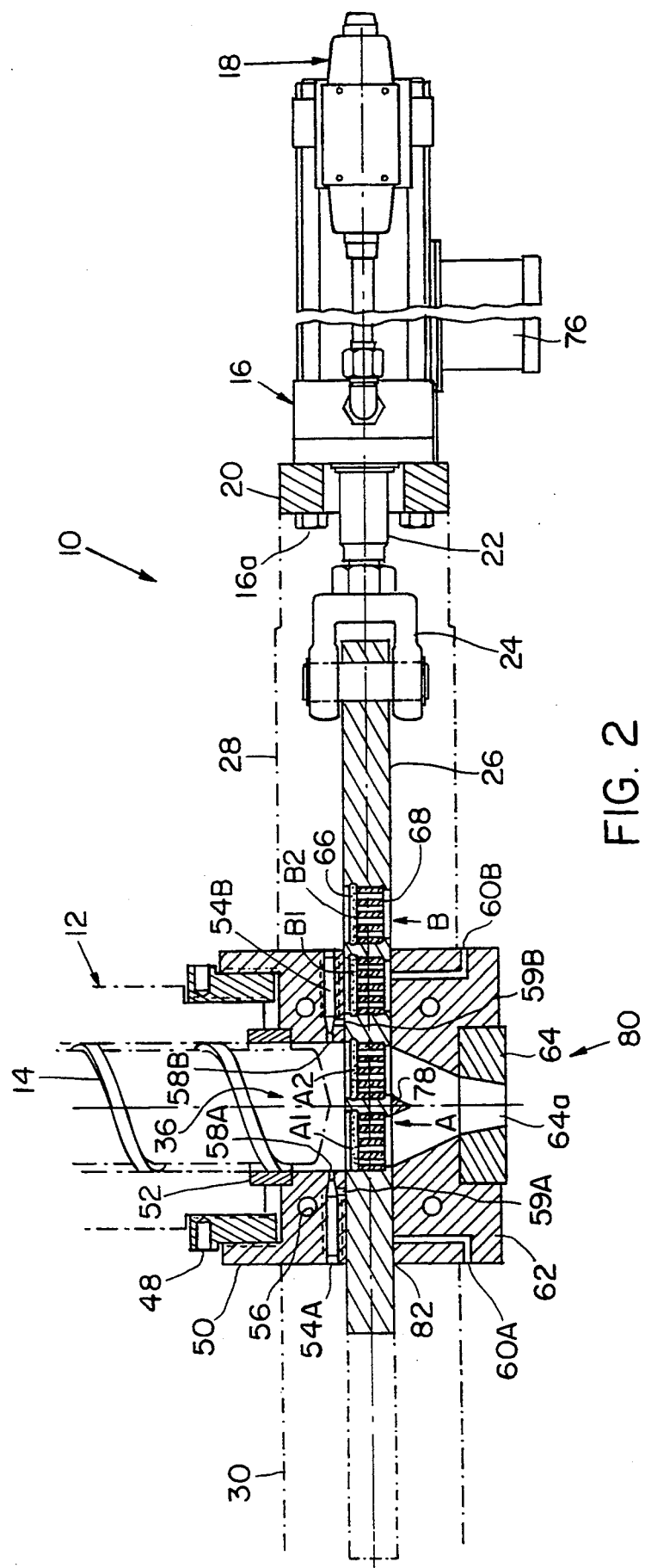

CONTINUOUS FLOW POLYMER FILTRATION APPARATUS AND PROCESS

BACKGROUND

In an extrusion process, polymer pellets are heated and melted as they are driven through a barrel by an extrusion screw. Plastic extruders generally require the filtration of impurities from the molten polymer exiting the extruder screw with a filter such as a screen in order to produce a high quality product. Once the filter has become dirty by trapping a certain amount of impurities, it is more difficult for the polymer to pass through the filter. As a result, the pressure of the polymer upstream from the filter increases and output decreases.

Various screen changing devices are available to replace dirty filters with clean filters. A well-known type of screen changer consists of a hydraulically operated slide in which two filter assemblies are located. One filter assembly is positioned on-line within the bore of the extruder to filter polymer while the other filter assembly is off-line external to the bore. In order to replace the dirty on-line filter with the clean off-line filter, the slide is shifted, thereby moving the clean filter on-line with the bore and moving the dirty filter off-line for replacement. A problem with conventional hydraulic screen changers is that there is a momentary leakage of polymer resulting in loss of pressure and flow while the slide is being shifted.

A solution to the flow and pressure interruption was proposed to allow for continuous flow operation with filter changing. That solution provided an array of filter modules adapted to slide through the extruder barrel, with only one filter positioned in the bore at a time. To allow for proper sealing during filter changes, a wide sealing region was provided to either side of the bore. A clean filter would shift into one sealing region as a clean filter shifted into the bore, a dirty filter shifted into the other sealing region, and yet another dirty filter shifted out of the barrel. The latter filter module would be removed, the filter could be changed and the module would be replaced at the clean filter side of the barrel. The need for manual handling of the filter modules proved cumbersome and undesirable.

A second solution uses a screen changer having dual bores and two sliding filters. During a normal operation, polymer flows through both bores and passes through both filters. When the filters become dirty, the filters are changed one bore at a time. A slide moves the dirty filter through a seal region to a location outside of the extruder barrel for changing. The polymer can flow through the one bore and remain continuous while the other bore is closed off by the slide.

SUMMARY OF THE INVENTION

A problem with the dual bore screen changer is that when the filters are dirty and one filter is being replaced, all of the polymer flow must flow through a single dirty filter. As a result, there is an increased resistance to polymer flow evidenced by a high pressure spike during filter changes. Furthermore, the need for dual bores requires lengths of flow lines to split the single bore exiting the extruder screw into two flow paths and combine them back together, resulting in a long flow path. As a result, the dual bore continuous flow changer is a rather bulky piece of machinery. The long flow path through the dual bore changer requires a larger inventory of polymer than single bore screen changers, and when one bore is closed off during a filter change, a stagnant branch of polymer is produced.

Accordingly, there is a need for a more compact continuous flow screen changer which does not produce stagnant branches of polymer or have long flow paths. Additionally, there is a need for a screen changer in which there is no high pressure spike during a filter change so that a more consistent product can be produced.

The present invention provides a continuous flow filter changing apparatus and method including a housing and a bore having a width extending through the housing. The bore defines a fluid path through which polymer is capable of flowing continuously. A reciprocating slide member moves within and is in sealing contact with a slide channel which extends through the housing of the filter changer transverse to the bore. The slide channel has a sealing region adjacent to the bore and extending a width between the bore and the exterior of the housing. The slide member intersects the fluid flow path of the bore and houses first and second filter assemblies which are proximate to each other. The slide member is capable of positioning either one of the first and second filter assemblies to be aligned with the bore during normal operation while the other of the first and second filter assemblies is off-line such that it is not in fluid communication with the bore. Each filter assembly comprises at least one filter element which has a width that is less than the width of the sealing region such that there is no fluid leakage path along the slide channel in communication between the bore and the exterior of the housing at any position of the slide member. This allows each filter assembly to be moved without objectionable polymer leakage to a position exterior of the sealing region such that the filter elements may be replaced.

The filter assemblies are proximately located in the slide member such that the distance between adjacent filter assemblies is less than the width of the bore. This ensures that the slide member does not completely obstruct the bore and that at least a portion of one filter assembly is in fluid communication with the bore at any position of the slide member such that there is continuous flow of filtered polymer through the bore. The moveable member is also adapted to position either of the first and second filter assemblies external to the housing to expose the filters for replacement while the other of the first and second filter assemblies is on-line such that it is in fluid communication with the bore both upstream and downstream of the other of the first and second filter assemblies.

In preferred embodiments, the distance between the first and second filter assemblies is less than the width of the sealing region such that when the slide member moves the other of the first and second filter assemblies to be exposed beyond the sealing region, the one filter assembly is partially misaligned with the bore. Additionally, passageways in fluid communication with the bore allow filter assemblies which are positioned off-line to be pre-filled with polymer and purged of air before moved on-line.

In one preferred embodiment, each filter assembly is made up of a single filter. In another embodiment, each filter assembly includes two or more filter elements which are proximate to each other. The plural filter elements of an assembly operate as a single filter in operation but permit shorter sealing regions for a more compact system.

The continuous flow filter changing apparatus provides a compact and simple apparatus and method for changing filters in an extruder without interrupting flow or causing excessive flow resistance. Additionally, the filter changer has a short, single bore and, therefore, a large inventory of polymer does not reside in the bore of the filter changer. Furthermore, there are no devious flow paths within the bore and as a result, stagnant flows of polymer do not form.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 2 is a top partial sectional view of the continuous flow filter changer of FIG. 1.

DETAILED DESCRIPTION OF THE PREFERRED EMBODIMENTS

Figure 1:
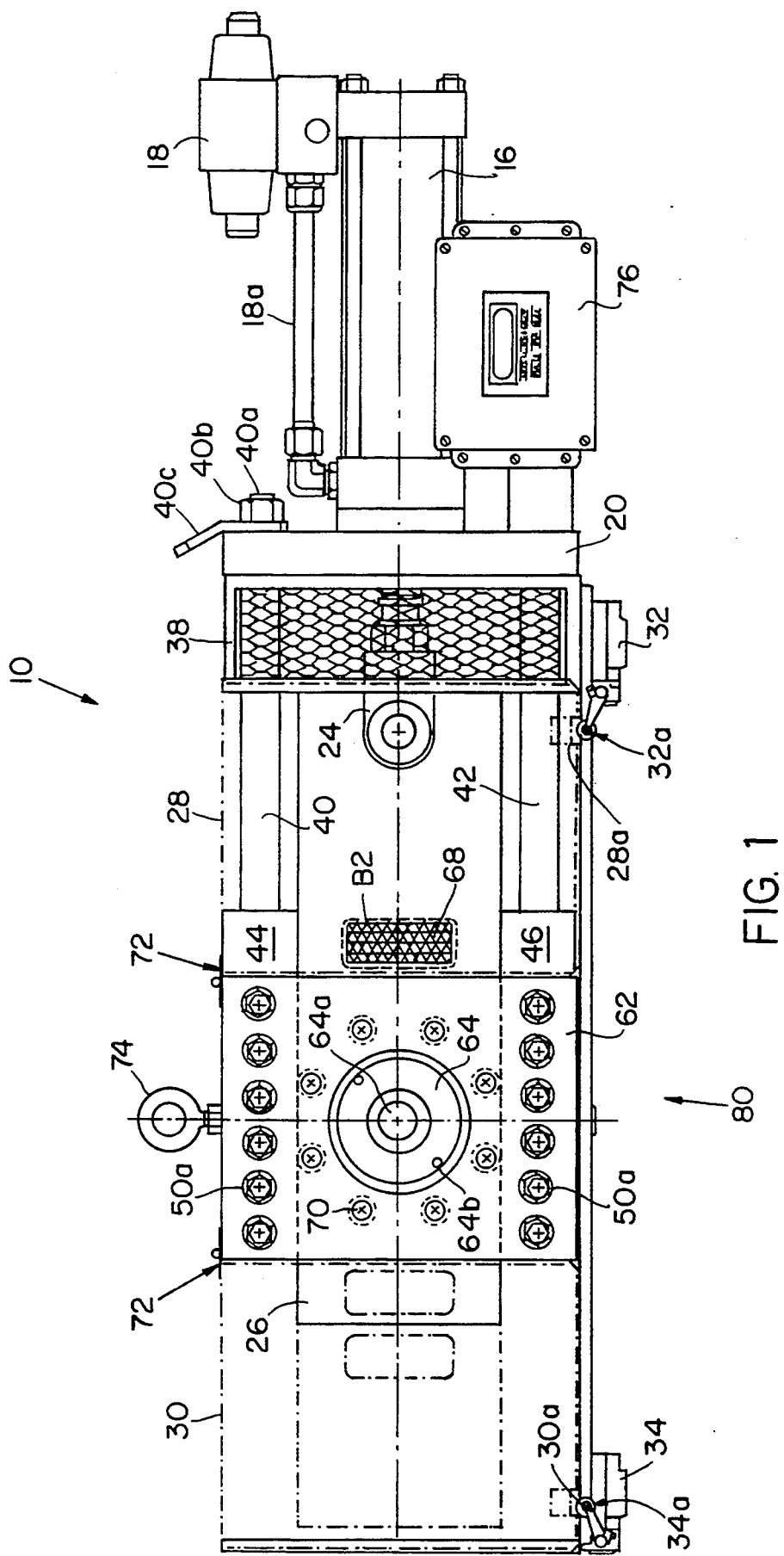
FIG. 1 is a front view of a continuous flow filter changer embodying the present invention.

In FIGS. 1 and 2, filter changer 10 includes a housing 80 having a tapering bore 36 which is affixed to an extruder 12 proximate to the extruder screw 14. Slidably attached within housing 80 is a slide member 26. Slide member 26 houses two filter assemblies A and B which are respectively split into two rectangular filtering regions A1, A2 and B1, B2, respectively, for filtering polymer which exits extruder 12. Each filtering region contains a rectangular breaker plate 68 positioned on a step, there being a number of holes formed within the plate, and a replaceable filter element 66. The surfaces of slide member 26 which border the filtering regions provide closed sealing surfaces for the filtering regions. Alternatively, the breaker plates 68 and filter elements 66 can be of other suitable shapes. Slide member 26 is connected by a coupling member 24 to a hydraulic cylinder 16 which actuates the motion of slide member 26.

In operation, hydraulic cylinder 16 moves slide member 26 to position either filter assembly A or B in alignment with bore 36 in order to filter impurities from polymer flowing through bore 36. In such a position, the filter assembly extends substantially across bore 36. When the filter elements 66 become dirty, slide member 26 is moved to position a clean filter assembly in alignment with bore 36 and move the dirty filter assembly off-line. Slide member 26 can then be further positioned to partially misalign the clean filter assembly with respect to bore 36 in order to position the dirty filter assembly beyond housing 80 so that the dirty filter elements 66 can be replaced. Once the dirty filter elements 66 are replaced, the clean filter assembly is realigned with bore 36. A more detailed description of this process is described further below in reference to FIGS. 3a–3e.

Housing 80 comprises of an upstream block 50 and a downstream block 62 which are separated by upper and lower spacers 44 and 46, respectively to form a slot or slide channel there between. Bolts 50a secure upstream block 50, downstream block 62, spacer 44 and spacer 46 together. Upstream block 50 is secured to extruder 12 by an adapter 48 which has a right handed internal thread and a left handed external thread. A spacer ring 52 provides the proper spacing between upstream block 50 and screw 14. Slide member 26 is captured within the slot formed by upstream block 50, downstream block 62, upper spacer 44 and lower spacer 46. The mating surfaces between slide member 26 with upstream block 50, downstream block 62, upper spacer 44 and lower spacer 46 provides sealing regions 82 so that polymer flowing through bore 36 is sealed from the atmosphere during normal operation.

Positioned within blocks 50 and 62 are four heaters 56 which heat housing 80 to prevent the polymer flowing through bore 36 from solidifying. A contoured fin 78 helps polymer to flow smoothly as it passes through the two filter elements 66 of a filter assembly. A bore adapter 64 has a tapered bore 64a which provides a smooth transition between bore 36 and the bore of equipment downstream from housing 80.

Tapped holes 64b located on the front surface of bore adapter 64 allow bore adapter 64 to be removed with a pulling device. Passageways 58B and 58A extend from bore 36 and are used to pre-fill a filter assembly through passages 59A and 59B prior to aligning the filter assembly with bore 36. When a filter element 66 is moved to be in-line with passageways 59A and 59B, passageways 60A and 60B vent the polymer to the atmosphere. Needle valves 54A and 54B control the flow rate of polymer flowing through passages 58A, 59A, 60A, 58B, 59B and 60B.

Upper and lower tie rods 40 and 42 have threaded ends which are screwed into spacers 44 and 46 respectively. The free ends 40a of tie rods 40 and 42 pass through and are secured to cylinder flange 20 by nuts 40b. In turn, hydraulic cylinder 16 is bolted to cylinder flange 20 by nuts 16a. The tie bars 40 and 42 in combination with cylinder flange 20 provide a rigid support for hydraulic cylinder 16. A valve 18 mounted to hydraulic cylinder 16 controls the flow of fluid through hydraulic line 18a and hydraulic cylinder 16, thereby, controlling the operation and positioning of slide member 26.

Safety guards 28 and 30 provide protection from the moving parts of slide changer 10 and are secured to housing 80 by hinges 72. Expanded metal section 38 provides visual access to the movement of slide member 26 as well as providing air flow for cooling. Limit switches 32 and 34 provide safety protection for slide changer 10 in that slide changer 10 will not operate unless guards 28 and 30 are lowered so that limit switch stops 28a and 30a are depressing lever arms 32a and 34a respectively.

Electrical box 76 is a junction box containing electrical terminals for limit switches 32 and 34, heaters 56, valve 18 and any transducers used in conjunction with hydraulic cylinder 16.

Figure 3A:
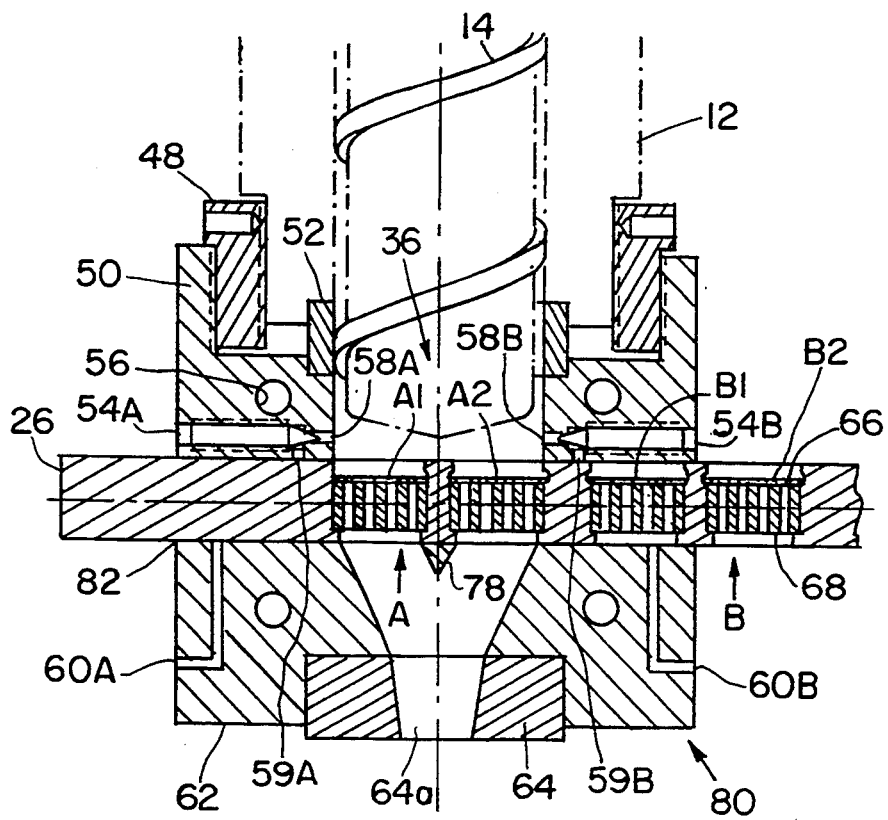
FIGS. 3a–3e are top sectional views of the bore and slide region of the filter changer of FIGS. 1 and 2 depicting various steps in the sequence of operation of the slide member.

The sequence of operation for changing and replacing filters is depicted in FIGS. 3a–3e. In FIG. 3a, filter assembly A is positioned in alignment with bore 36 to filter polymer passing through bore 36 while filter assembly B is off-line. Slide member 26 is positioned to seal passages 58A, 58B, 59A and 59B, thereby, sealing bore 36 from the atmosphere.

Figure 3B:
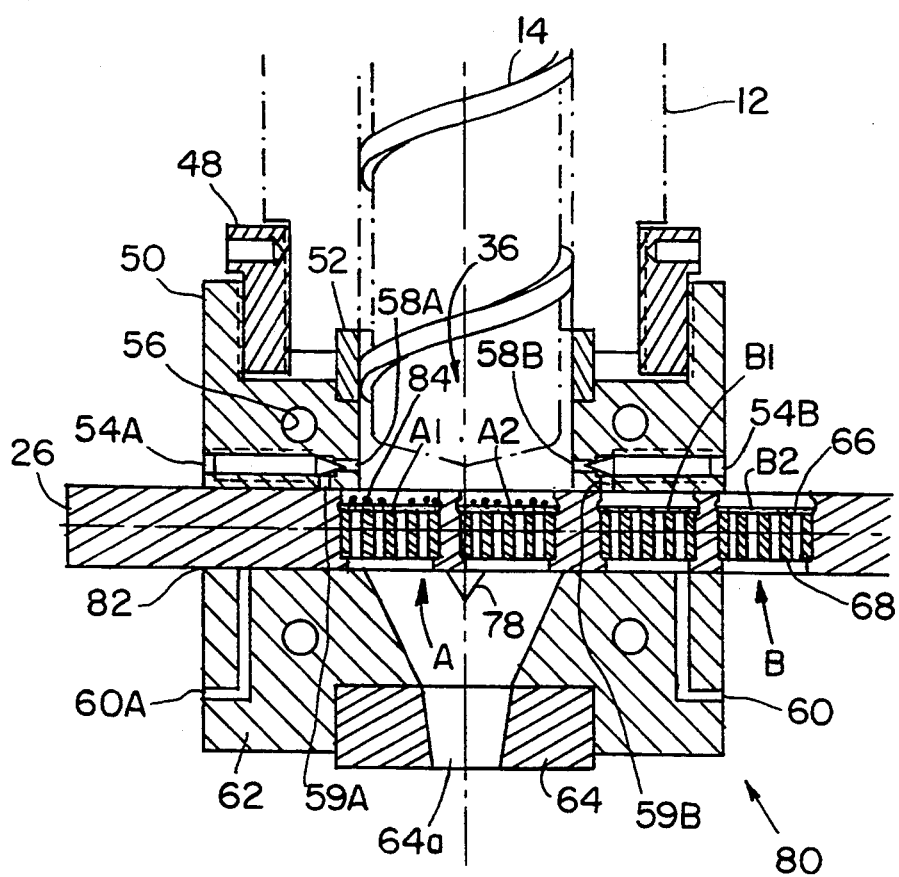

Referring to FIG. 3b, impurities 84 have collected on the filters 66 of filter regions A1 and A2, thereby necessitating a filter change. Slide member 26 is moved to the left to slightly misalign filter assembly A with bore 36. This is done to shift filter B1 into position for pre-filling where passageway 59B is no longer blocked by slide member 26. A small flow of polymer passes through passageways 58B and 59B and through filter B1 and exits to the atmosphere through passageway 60B. Pre-filling filter B1 removes any air bubbles and provides for a smooth transition when filter B1 is introduced into bore 36.

Figure 3C:
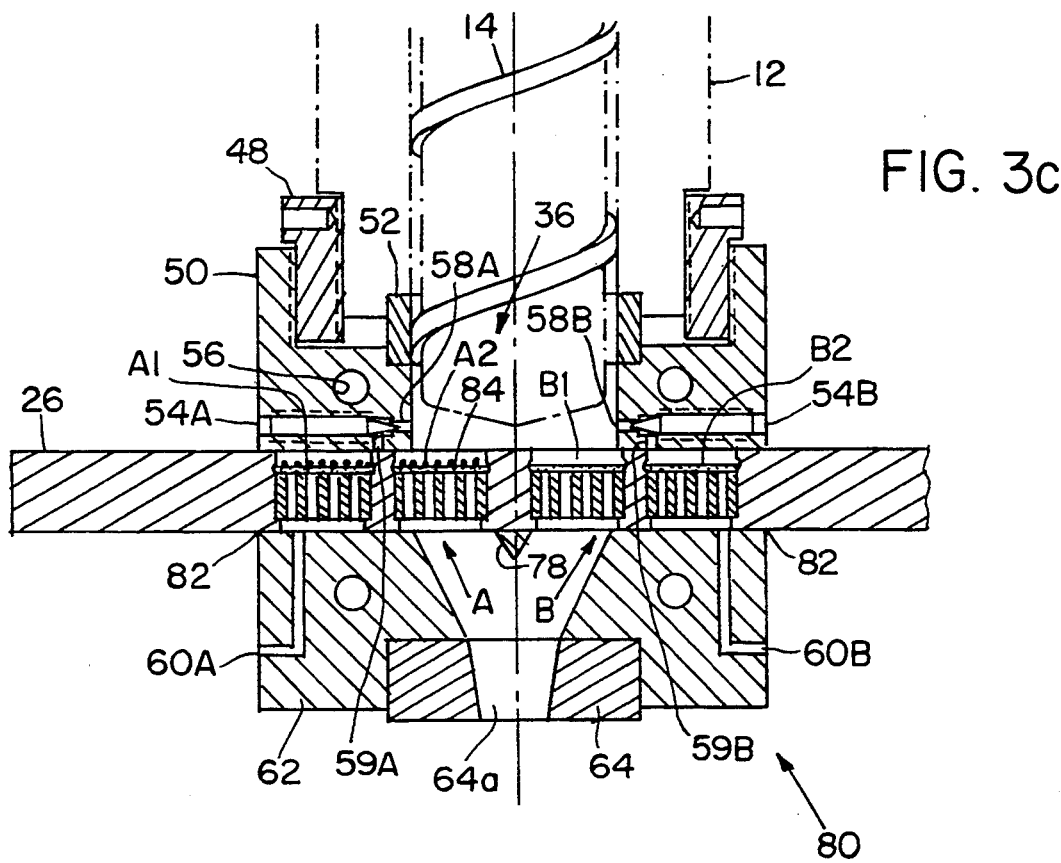

Referring to FIG. 3c, slide member 26 is shifted even further to the left so that filter A1 is completely off-line with filters A2 and B1 being on-line. Filter B2 is in position to be pre-filled via passageways 58B, 59B and 60B.

Figure 3D:
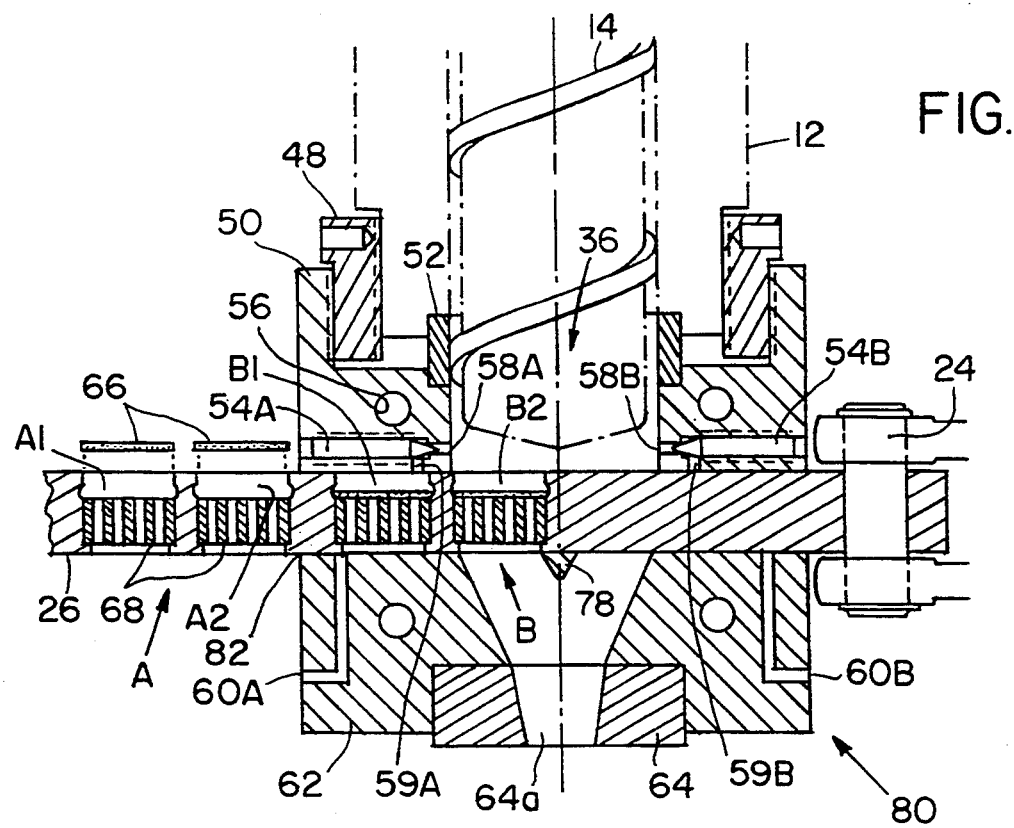

Referring to FIG. 3d, slide member 26 is shifted even further so that filter assembly B is partially off-line in that only filter region B2 is on-line. In this position filter assembly A is pushed beyond sealing region 82 so that new filter elements 66 can be positioned within filter regions A1 and A2. Although only filter region B2 is on-line, this does not significantly raise the pressure within bore 36 since filter B2 has a clean filter element 66. At this point, filter region B1 is in a prefilling position, receiving polymer from passageways 58A and 59A and venting the polymer through passageway 60a to the atmosphere. This keeps polymer flowing through filter region B1 and ensures that polymer does not cook within filter region B1 while filter assembly A is being replaced.

Figure 3E:
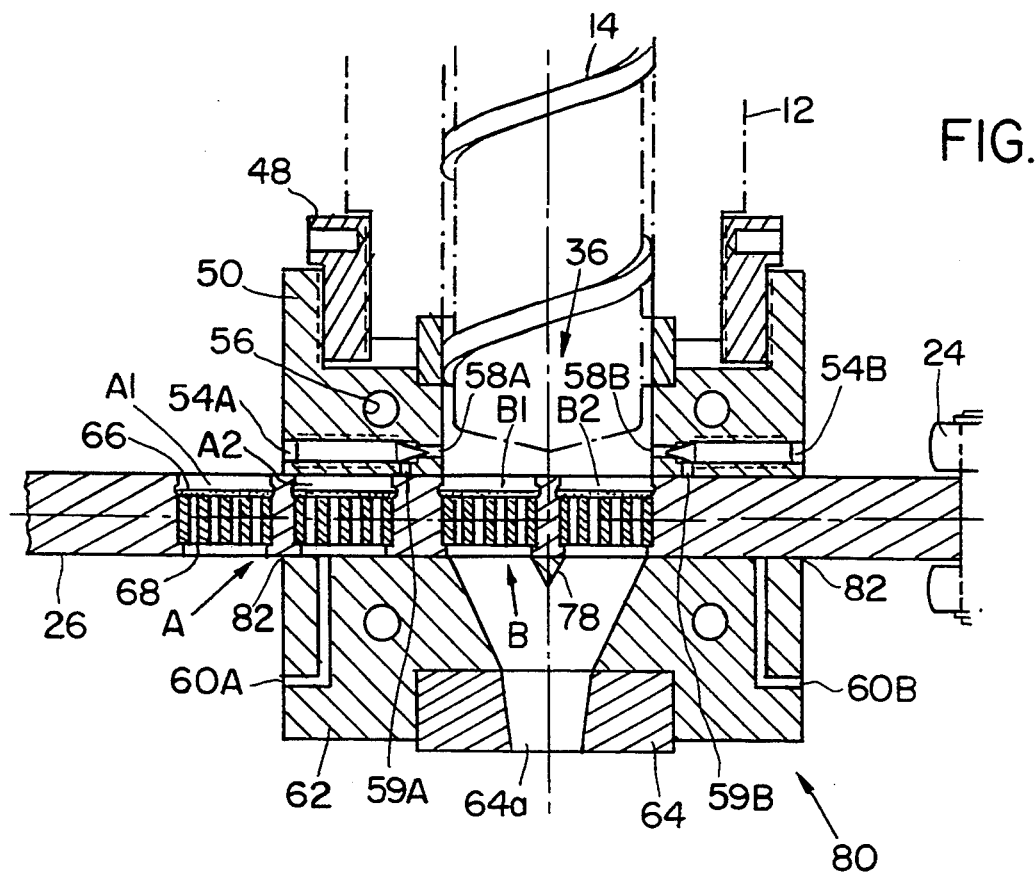

Referring to FIG. 3e, the filter elements 66 in filter assembly A have been replaced and slide member 26 has been repositioned so that both filter regions B1 and B2 of filter assembly B are on-line. Slide member 26 seals off passageways 59A and 59B so that polymer flowing through bore 36 is sealed from the atmosphere and filter region A2 remains clean.

Figure 4:
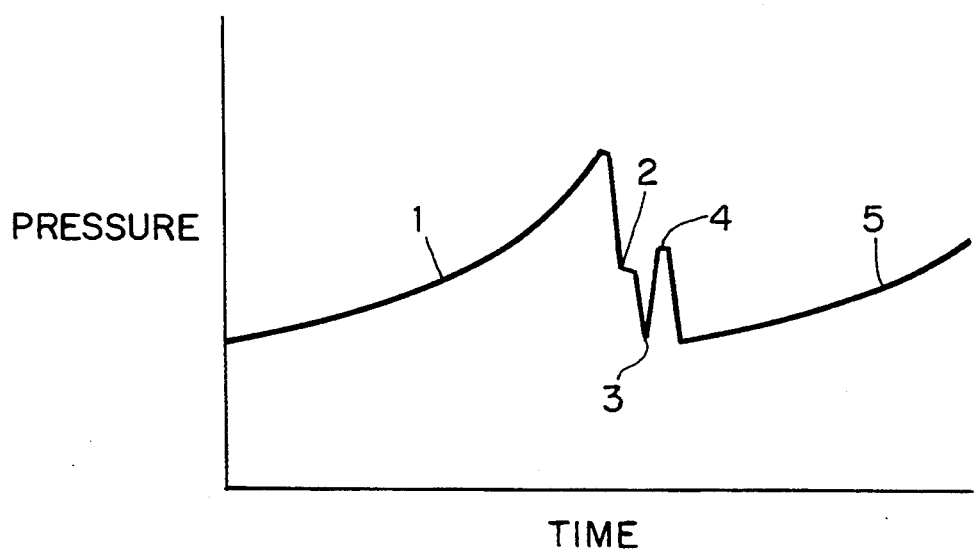
FIG. 4 is a graph depicting the relative pressure versus time for the sequence of FIGS. 3a–3e.

FIG. 4 depicts a graph showing the relative pressure of polymer within bore 36 in relation to time for each sequence depicted in FIGS. 3a through 3e. The curve in region 1 depicts a pressure build up caused by impurities accumulating on the filter assembly during normal operation with the slide positioned as in FIG. 3a. The drop in pressure depicted in region 2 indicates the introduction of a clean filter region B1 as seen in FIG. 3c. A further decrease in pressure to region 3 is caused when both filter regions B1 and B2 are positioned on-line with bore 36. An acceptable increase in pressure depicted in region 4 is caused when a single filter region B2 is in-line with bore 36 during a filter change as seen in FIG. 3d. The pressure then drops back down in region 5 when filter regions B1 and B2 are put back on-line for normal operation as seen in FIG. 3e. The pressure then begins to increase again as filter regions B1 and B2 accumulate impurities. At this point the filters in filter assembly B would need to be changed in the same manner as depicted for filter assembly A except that slide 26 is shifted or reciprocated in the opposite direction.

Figure 5A:
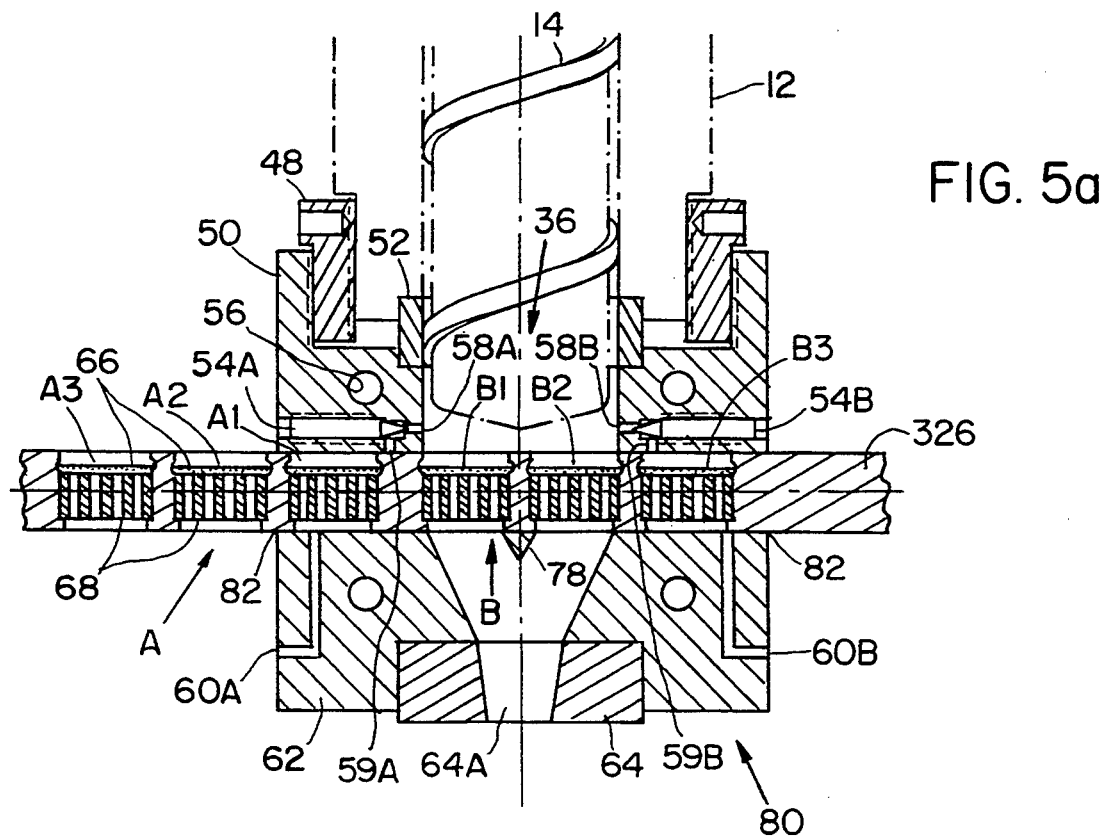
FIGS. 5a and 5b are top sectional views of the bore and slide region of a preferred filter changer depicting two steps in the sequence of operation of the slide member.
Figure 5B:
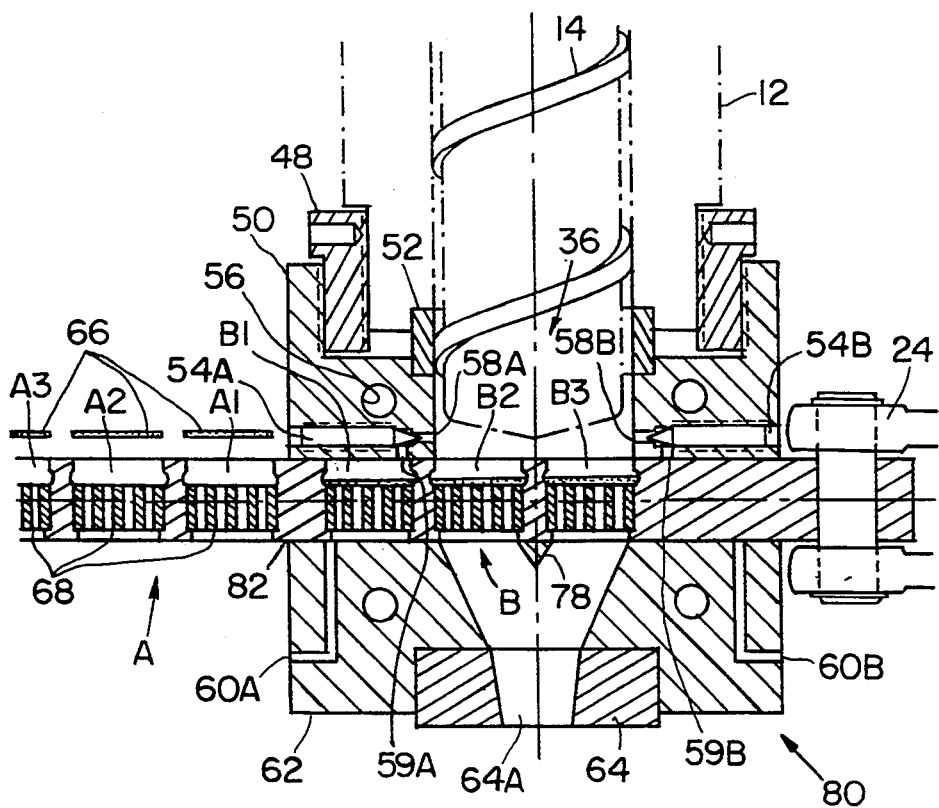

FIG. 5a depicts a preferred embodiment in which slide member 326 houses filter assemblies A and B consisting of three filtering regions A1, A2, A3 and B1, B2, B3 respectively. By having three filter regions, for each filter assembly, filter regions A3 and B3 are in-line with bore 36 only when filter regions A1, A2 or B1, B2 are being replaced as depicted in FIG. 5b. This allows two filter regions to be in line with bore 36 when the filter elements are being replaced in a filter assembly.

Figure 6A:
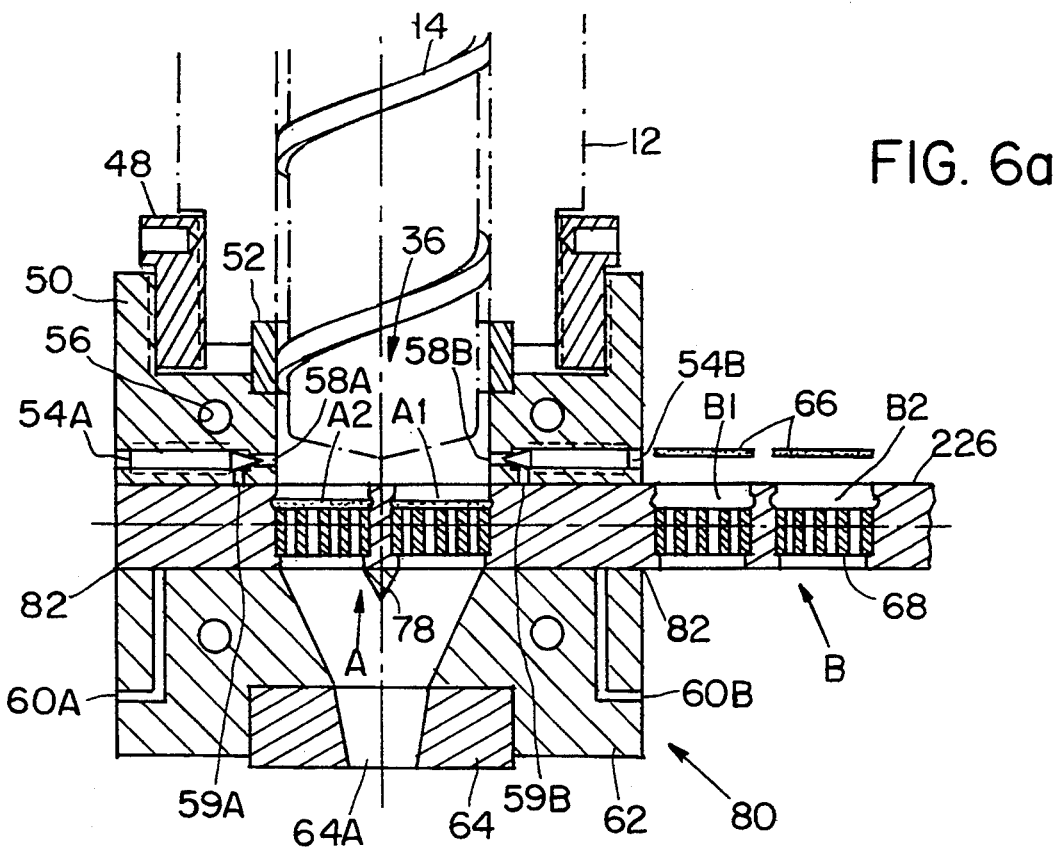
FIGS. 6a–6e are top sectional views of the bore and slide region of another preferred filter changer depicting various steps in the sequence of operation of the slide member.

The sequence of operation for changing and replacing filters for yet another preferred embodiment of the present invention is depicted in FIGS. 6a–6e. In FIG. 6a, slide member 226 differs from slide 26 (FIG. 2) in that filter assemblies A and B are spaced apart from each other at a sufficient distance so that the filter elements 66 of filter assembly B can be replaced while filter assembly A is in alignment with bore 36.

In operation, filter assembly A is positioned in alignment with bore 36 to filter polymer passing through bore 36 while filter assembly B is off-line. Slide member 226 is positioned to block passageways 59A and 59B, thereby sealing bore 36 from the atmosphere.

Figure 6B:
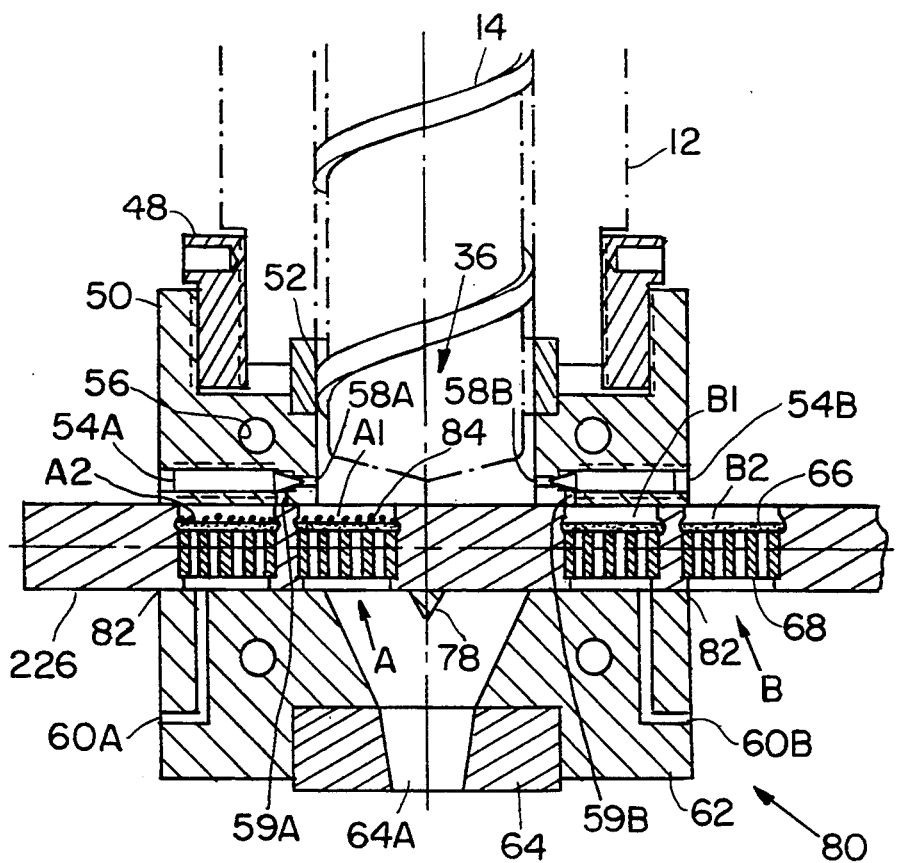

Referring to FIG. 6b, impurities 84 have collected on the filter elements 66 of filter assembly A, thereby necessitating a filter change. Slide member 226 is moved to the left to misalign filter assembly A with bore 36 so that only filtering region A1 is on-line with bore 36. This is done to shift filter assembly B into position for pre-filling where passageway 59B is no longer blocked by slide member 226. A small flow of polymer passes through passageways 58B and 59B through filtering region B1 and exits to the atmosphere through passageway 60B.

Figure 6C:
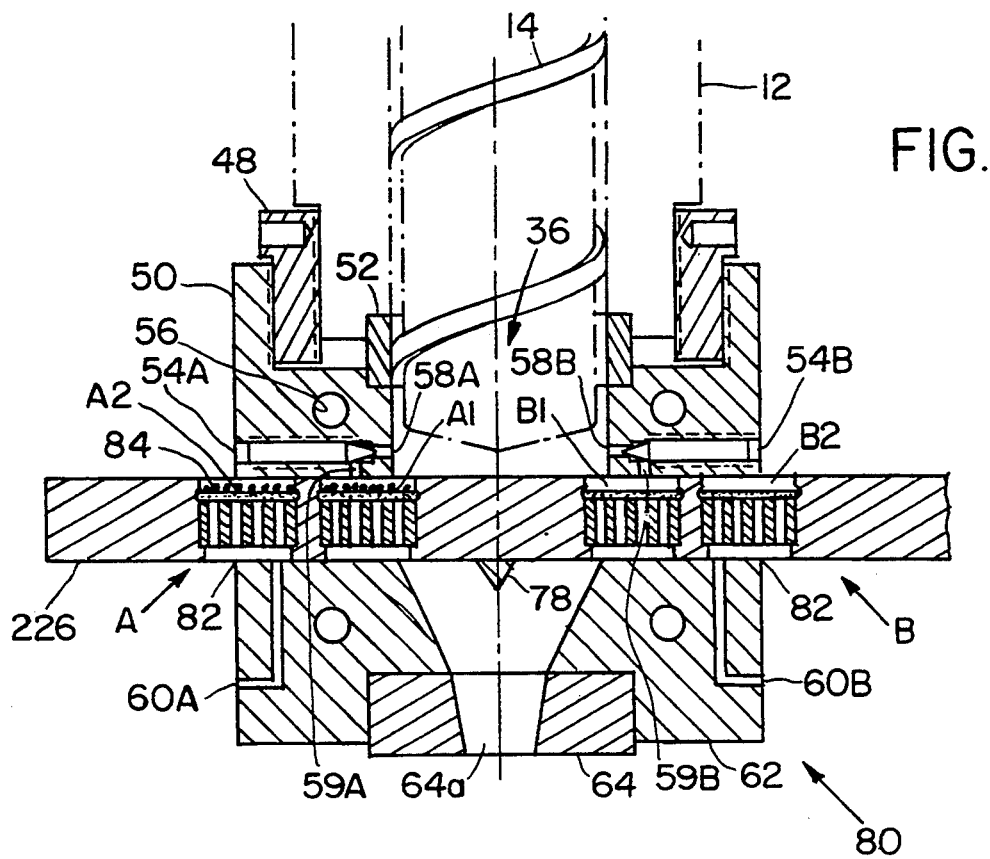

Referring to FIG. 6c, slide member 226 is shifted even further to the left so that a portion of both filtering regions A1 and B1 are on-line with bore 36.

Figure 6D:
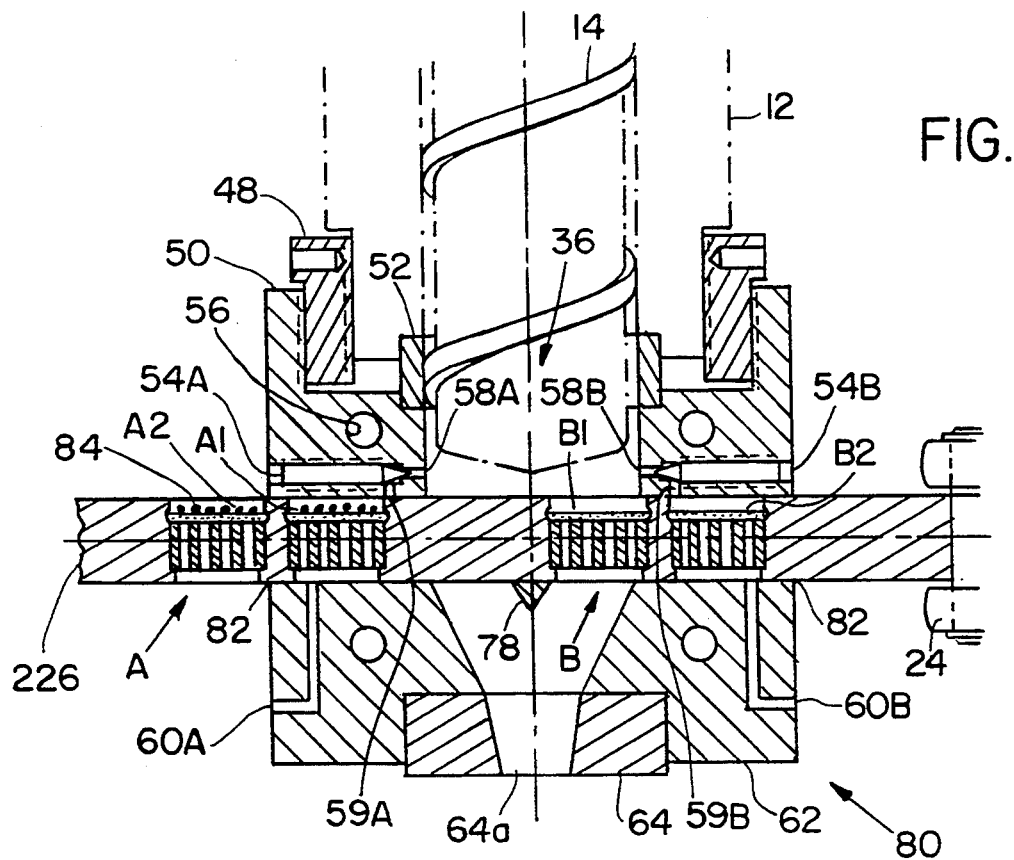

Referring to FIG. 6d, slide member 226 is shifted further so that filter assembly A is off-line and filtering region B1 is on-line with bore 36. Filtering region B2 is in position to be pre-filled via passageways 58B, 59B and 60B.

Figure 6E:
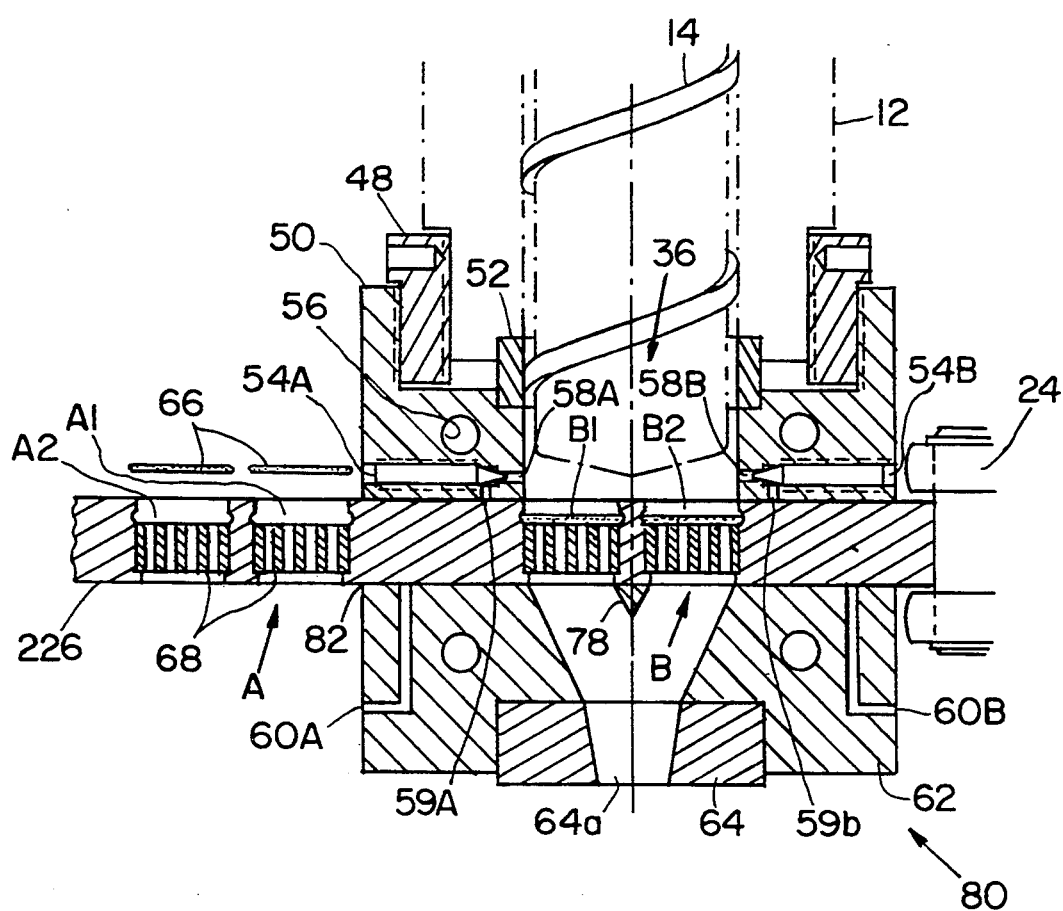

Referring to FIG. 6e, both filtering regions B1 and B2 are in-line with bore 36. Filter assembly A is positioned beyond the housing 80 enabling filter elements 66 to be replaced. When impurities collect on filters 66 of filter assembly A, thereby necessitating another filter change, the process is repeated with slide member 226 reciprocating in the opposite direction.

Figure 7A:
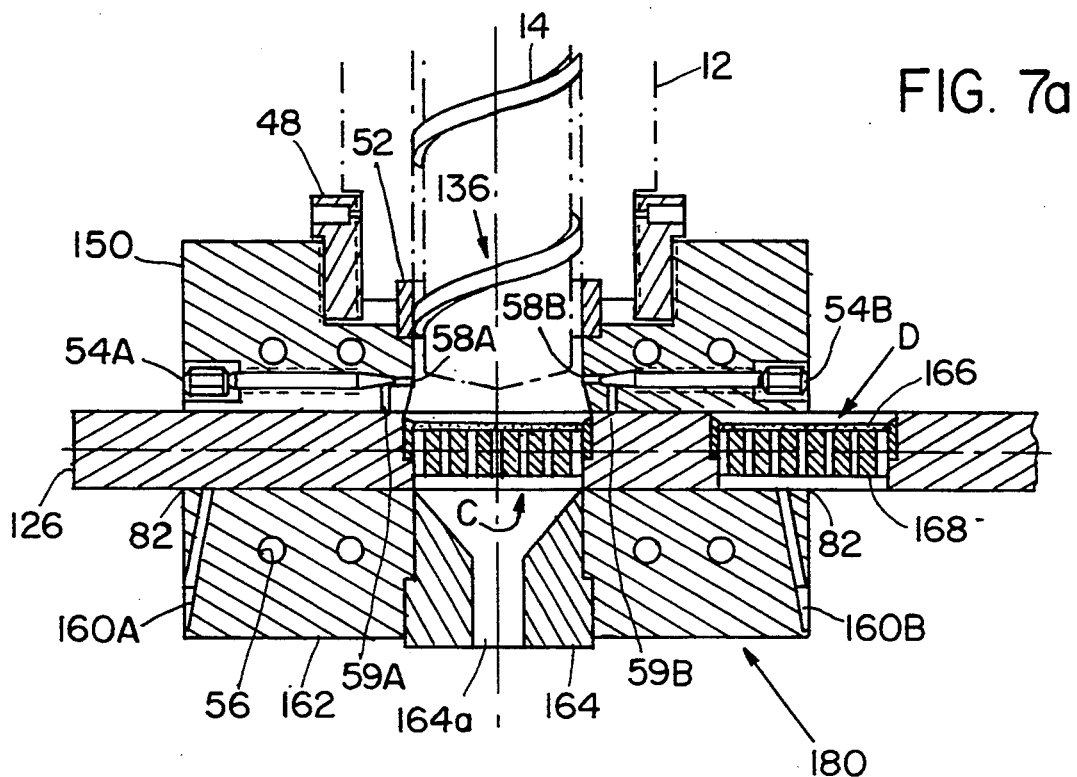
FIGS. 7a–7e are top sectional views of the bore and slide region of yet another preferred filter changer depicting various steps in the sequence of operation of the slide member.

The sequence of operation for changing and replacing filters for still another preferred embodiment of the present invention is depicted in FIGS. 7a–7e. In FIG. 7a, slide member 126 differs from slide 26 (FIG. 2) in that slide member 126 houses two filter assemblies C and D, where each filter assembly comprises a single circular breaker plate 168 and filter element 166. Eight heaters 56 are positioned in upstream and downstream blocks 150 and 162 for heating polymer flowing through bore 136. Blocks 150 and 162 are wider than blocks 50 and 62 (FIG. 2) in order to properly seal filter assemblies C and D. Passageways 160A and 160B are straight and allow a smooth flow path which is easy to clean. The bore 164A of adapter 164 is tapered to adapt bore 136 to the bore of downstream equipment. Adapter 164, filter elements 166 and breaker plates 168 are easily removeable such that screw 14 can be passed through straight bore 136 for removal without disassembling housing 180.

Figure 8:
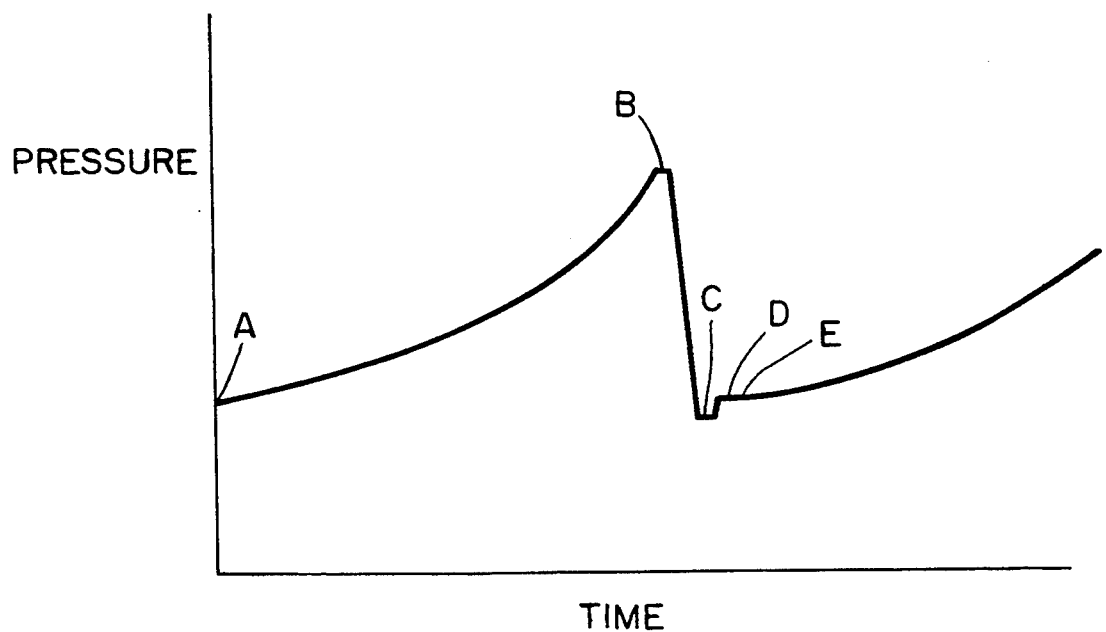
FIG. 8 is a graph depicting the relative pressure versus time for the sequence of FIGS. 7a–7e.

In operation, filter assembly C is positioned in alignment with bore 136 to filter polymer passing through bore 136 while filter assembly D is off-line. Slide member 126 is positioned to block passageways 59A and 59B, thereby sealing bore 136 from the atmosphere. The pressure of polymer within bore 136 at this point in time is designated by "A" in FIG. 8.

Figure 7B:
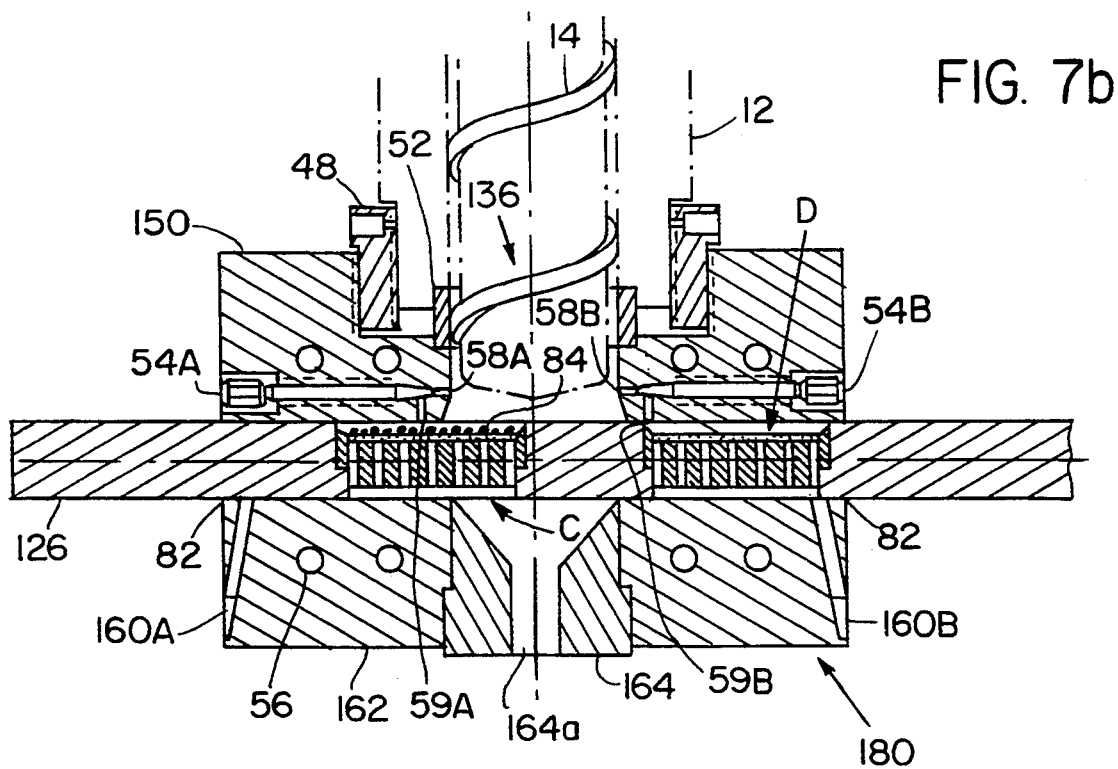

Referring to FIG. 7b, impurities 84 have collected on the filter element 166 of filter assembly C, thereby necessitating a filter change. Slide member 126 is moved to the left to slightly misalign filter assembly A with bore 136. This is done to shift filter assembly D into position for pre-filling where passageway 59B is no longer blocked by slide member 126. A small flow of polymer passes through passageways 58B and 59B through filter assembly D and exits to the atmosphere through passageway 60B. Although filter assembly C is only partially on-line with bore 136, the flow of polymer through filter assembly C is not substantially impeded because the polymer still has access to the full surface area of filter assembly C. The pressure of polymer in bore 136 at this point in time is designated by "B" in FIG. 8.

Figure 7C:
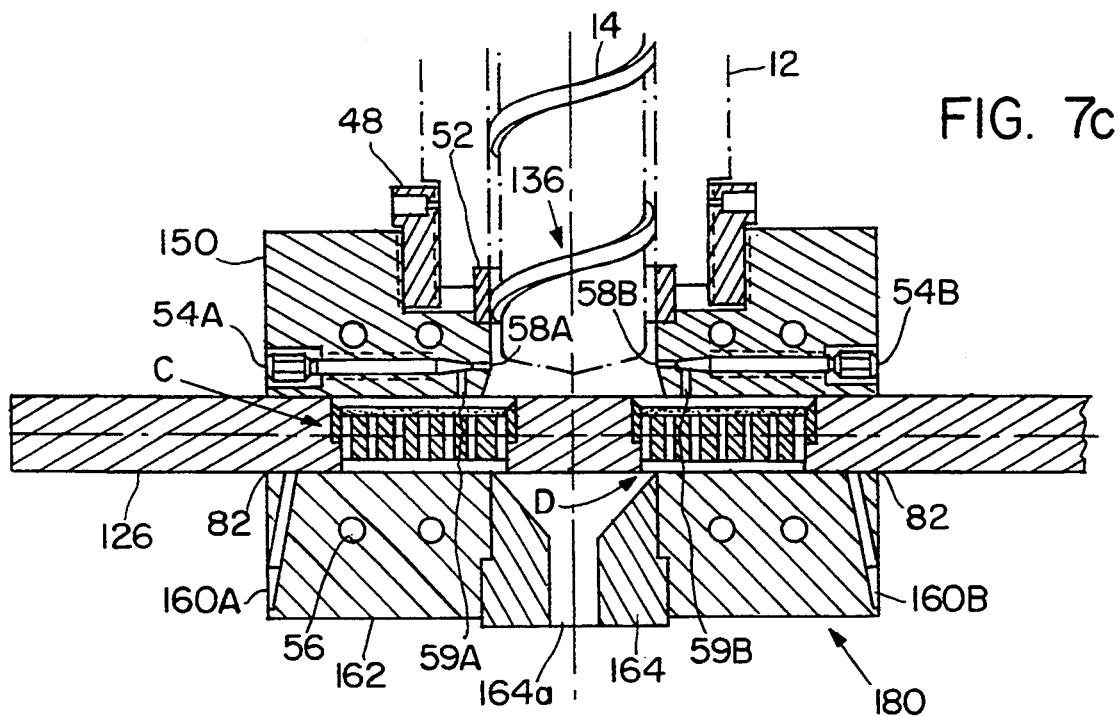

Referring to FIG. 7c, slide member 126 is shifted even further to the left so that a portion of filter assemblies C and D are on-line with bore 136. A drop in the pressure of polymer in bore 136 at this point in time is caused by the introduction of clean filter assembly D and is designated by "C" in FIG. 8.

Figure 7D:
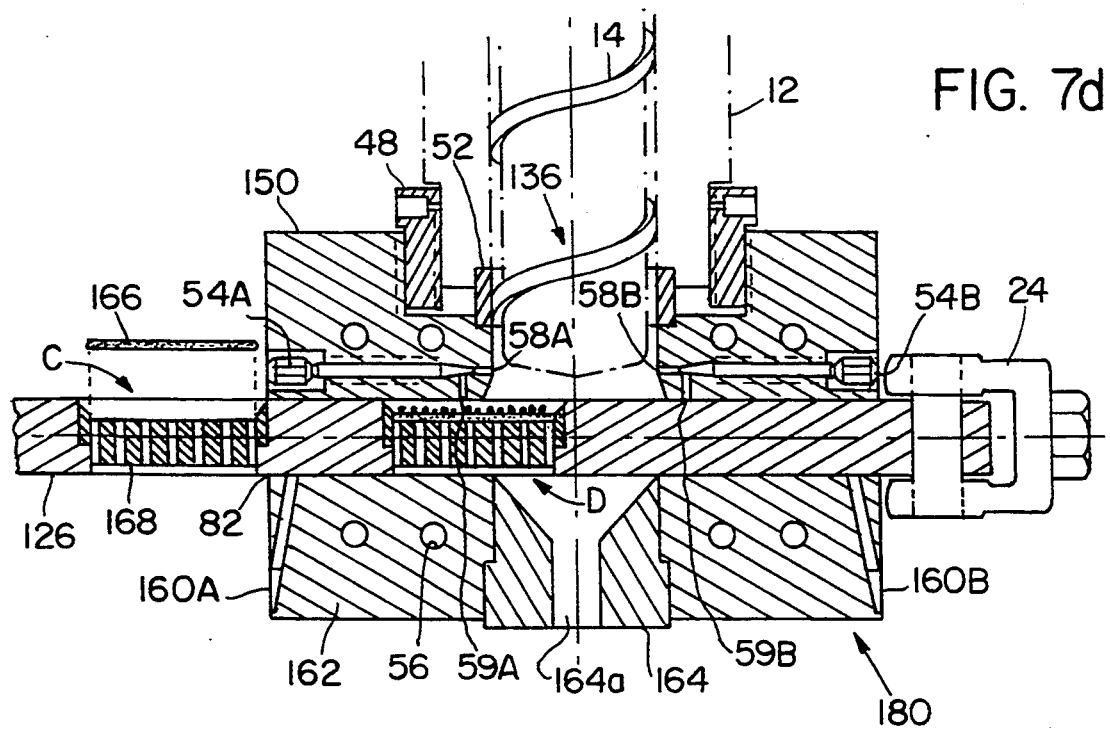

Referring to FIG. 7d, slide member 126 is shifted even further to the left so that filter assembly D is partially off-line and filter assembly C is exposed beyond housing 180. In this position, the contaminated filter element 166 of filter assembly C can be replaced with a clean filter element. A slight rise in pressure of polymer in bore 136 as designated by "D" in FIG. 8 occurs because only one filter assembly is on-line at this point in time.

Figure 7E:
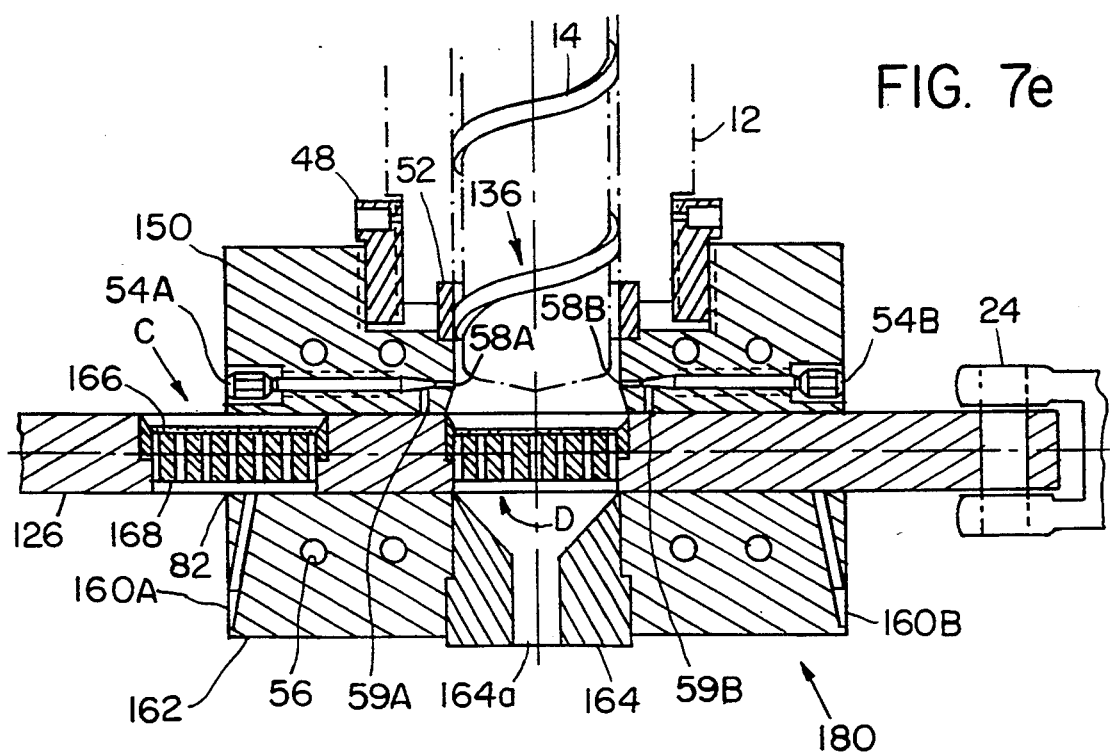

Referring to FIG. 7e, the filter element 166 in filter assembly C has been replaced and slide member 126 has been repositioned so that filter assembly D is on-line with bore 136. Slide member 126 seals off passageways 59A and 59B so that polymer flowing through bore 136 is sealed from the atmosphere and filter assembly C remains clean. The pressure of polymer in bore 136 at this point in time is designated by "E" in FIG. 8. When impurities collect on filters 166 of filter assembly D, thereby necessitating another filter change, the process is repeated with slide member 126 reciprocating in the opposite direction.

Equivalents

While this invention has been particularly shown and described with references to preferred embodiments thereof, it will be understood by those skilled in the art that various changes in form and details may be made therein without departing from the spirit and scope of the invention as defined by the appended claims. For example, the slide member may pivot and reciprocate in an arc. Additionally, the slide member may be operated by non-hydraulic means. Pre-filling of the filter element through vents is preferred but systems are known which simply move filter elements slowly into position with gradual filling. The slide member and the slot in the housing may be of circular rather than rectangular section. Each of the filter assemblies may be comprised of more than two filter elements.

I claim:

1. A continuous flow polymer filtration apparatus comprising:

a housing;

a bore having a width extending through the housing, the bore defining a fluid flow path through which polymer is capable of flowing continuously;

a slide channel extending through the housing transverse to the bore, the slide channel having a sealing region adjacent to the bore and extending a width between the bore and the exterior of the housing;

a reciprocating slide member secured within the slide channel capable of moving in a direction transverse to the bore;

a first filter assembly, comprising at least one filter element, housed within the slide member to be positioned in-line with and extending substantially across the bore, each filter element of the first filter assembly having a width that is less than the width of the sealing region; and a second filter assembly, comprising at least one filter element, housed within the slide member to be positioned in-line with the bore proximate the first filter assembly, each filter element of the second filter assembly having a width that is less than the width of the sealing region, the distance between the first and second filter assemblies being less than the width of the bore such that at least one filter element is in fluid communication with the bore at any position of the slide member thereby allowing a continuous flow of polymer through the bore;

the slide member having a sealing surface bordering the first and second filter assemblies for contacting the sealing region of the slide channel for sealing around the first and second filter assemblies, the slide member being adapted to move one of the first and second filter assemblies to be aligned with the bore during normal operation while the other of the first and second assemblies is off-line with the bore, and to position at least a portion of one of the first and second filter assemblies within the fluid flow path while the other of the first and second filter assemblies is exposed beyond the sealing region for changing the at least one filter element, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

2. The apparatus of claim 1 in which the distance between the first and second filter assemblies is less than the width of the sealing region such that when the slide member moves the other filter assembly to be exposed beyond the sealing region, the one filter assembly is partially misaligned with the bore.

3. The apparatus of claim 1 in which each of the first and second filter assemblies comprises two filter elements.

4. The apparatus of claim 1 further comprising a passageway in fluid communication with the bore for pre-filling the other filter assembly with polymer before the other filter assembly is aligned with the bore.

5. A continuous flow polymer filtration apparatus comprising:
- a housing;
- a single bore having a width extending through the housing, the bore defining a fluid flow path through which polymer is capable of flowing continuously;
- a slide channel extending through the housing transverse to the bore, the slide channel having a sealing region adjacent to the bore and extending a width between the bore and the exterior of the housing;
- a reciprocating slide member secured, within the slide channel capable of moving in a direction transverse to the bore;
- a first filter assembly, comprising at least one filter element, housed within the slide member to be positioned in-line with and extending substantially across the bore, each filter element of the first filter assembly having a width that is less than the width of the sealing region;
- a second filter assembly, comprising at least one filter element, housed within the slide member to be positioned in-line with the bore proximate the first filter assembly, each filter element of the second filter assembly having a width that is less than the width of the sealing region, the distance between the first and second filter assemblies being less than the width of the bore such that at least one filter element is in fluid communication with the bore at any position of the slide member thereby allowing a continuous flow of polymer through the bore; and
- a passageway in fluid communication with the bore for pre-filling the filter assemblies with polymer before aligning the filter assemblies with the bore;
- the slide member having a sealing surface bordering the first and second filter assemblies for contacting the sealing region of the slide channel for sealing around the first and second filter assemblies, the slide member being adapted to move one of the first and second filter assemblies to be aligned with the bore during normal operation while the other of the first and second assemblies is off-line with the bore, and to position at least a portion of one of the first and second filter assemblies within the fluid flow path while the other of the first and second filter assemblies is exposed beyond the sealing region for changing the at least one filter element, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

6. The apparatus of claim 5 in which the distance between the first and second filter assemblies is less than the width of the sealing region such that when the slide member moves the other filter assembly to be exposed beyond the sealing region, the one filter assembly is partially misaligned with the bore.

7. The apparatus of claim 5 in which each of the first and second filter assemblies comprises two filter elements.

8. A continuous flow polymer filtration apparatus comprising:
- a bore having a fluid flow path through which polymer is capable of flowing continuously;
- a reciprocating slide member intersecting the bore;
- a first filter assembly housed within the slide member to be positioned in-line with the bore; and
- a second filter assembly housed within the slide member proximate the first filter assembly to be positioned in-line with the bore;
- the slide member having a sealing surface bordering the first and second filter assemblies for sealing around the first and second filter assemblies, the slide member being adapted to move each one of the first and second filter assemblies to be aligned with the bore during normal operation while the other of the first and second filter assemblies is off-line with the bore, the slide member also being adapted to move the one filter assembly to be partially misaligned with the bore in order to expose the other filter assembly for replacing the filter of the other filter assembly, the first and second filter assemblies reciprocating back and forth into position with reciprocating of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

9. The apparatus of claim 8 further comprising a sealing region adjacent to the bore for sealing the slide member.

10. The apparatus of claim 8 in which each of the first and second filter assemblies comprises two filter elements.

11. The apparatus of claim 10 in which width of the sealing region is greater than the width of each filter element.

12. The apparatus of claim 8 in which each filter assembly comprises a single filter element.

13. The apparatus of claim 12 in which the width of the sealing region is greater than the width of each filter element.

14. The apparatus of claim 8 further comprising a passageway in fluid communication with the bore for pre-filling the other filter assembly with polymer before the other filter assembly is aligned with the bore.

15. A continuous flow polymer filtration apparatus comprising:
- a bore having a flow path through which polymer is capable of flowing continuously;
- a sealing region adjacent to the bore;
- a reciprocating slide member movably secured to the sealing region and intersecting the bore;
- a first filter assembly housed within the slide member to be positioned in-line with the bore; and
- a second filter assembly housed within the slide member proximate to the first filter assembly to be positioned in-line with the bore;

the slide member having a sealing surface bordering the first and second filter assemblies for contacting the sealing region for sealing around the first and second filter assemblies, one of the first and second filter assemblies being aligned with the bore and the other of the first and second filer assemblies being off-line during normal operation, the slide member capable of moving the other filter assembly to be aligned with the bore when the one filter assembly is dirty as well as moving the other filter assembly to be partially misaligned with the bore in order to expose the one filter assembly beyond the sealing region so that the one filter assembly can be replaced, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

16. The apparatus of claim 15 in which each first and second filter assembly comprises two filter elements.

17. The apparatus of claim 16 in which the width of the sealing region is greater than the width of each filter element.

18. The apparatus of claim 15 in which each filter assembly comprises a single filter element.

19. The apparatus of claim 18 in which the width of the sealing region is greater than the width of each filter element.

20. The apparatus of claim 15 further comprising a passageway in fluid communication with the bore for pre-filling the other filter assembly with polymer before the other filter assembly is aligned with the bore.

21. A method of changing filters in a continuous flow operation comprising the steps of:
   filtering polymer flowing continuously through a bore defining a width extending through a housing with a first filter assembly aligned with the bore during normal operation, the first filter assembly comprising at least one filter element being housed within a slide member movably sealed within a slide channel transverse to the bore, the first filter assembly being proximate to a second filter assembly housed within the slide member, the second filter assembly comprising at least one filter element which is off-line with the bore, the slide channel having a sealing region adjacent to the bore and extending a width between the bore and the exterior of the housing, the width of the sealing region being greater than the width of the at least one filter element of the first and second filter assemblies;
   sealing around the first and second filter assemblies with a sealing surface on the slide member, the sealing surface bordering the first and second filter assemblies and contacting the sealing region of the slide channel; and
   reciprocating the slide member to move the first filter assembly off-line with the bore and the second filter assembly in-line with the bore, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member, the distance between the first and second filter assemblies being less than the width of the bore such that at least one filter element is in fluid communication with the bore at any position of the slide member.

22. The method of claim 21 further comprising the step of exposing the second filter assembly beyond the housing so that the second filter assembly can be replaced.

23. The method of claim 22 further comprising the step of moving the slide member to partially misalign the first filter assembly with the bore in order to expose the second filter assembly beyond the housing so that the second filter assembly can be replaced.

24. The method of claim 21 further comprising the step of pre-filling the at least one filter element of the second filter assembly with polymer before moving the second filter assembly in-line with the bore.

25. A method of changing filters in a continuous flow operation comprising the steps of:
   filtering polymer flowing continuously through a bore defining a width extending through a housing with a first filter assembly aligned with the bore during normal operation, the first filter assembly compromising at least one filter element being housed within a slide member movably sealed within a slide channel transverse to the bore, the first filter assembly being proximate to a second filter assembly housed within the slide member, the second filter assembly comprising at least one filter element which is off-line with the bore, the slide channel having a sealing region adjacent to the bore and extending a width between the bore and the exterior of the housing, the width of the sealing region being greater than the width of the at least one filter element of the first and second filter assemblies;
   sealing around the first and second filter assemblies with a sealing surface on the slide member, the sealing surface bordering the first and second filter assemblies and contacting the sealing region of the slide channel;
   reciprocating the slide member to move the first filter assembly off-line with the bore and the second filter assembly in-line with the bore, the distance between the first and second filter assemblies being less than the width of the bore such that at least one filter element is in fluid communication with the bore at any position of the slide member; and
   exposing the second filter assembly beyond the housing so that the second filter assembly can be replaced, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

26. The method of claim 25 further comprising the step of pre-filling the at least one filter element of the second filter assembly with polymer before moving the second filter assembly in-line with the bore.

27. The method of claim 25 further comprising the step of moving the slide member to partially misalign the first filter assembly with the bore in order to expose the second filter assembly beyond the housing so that the second filter assembly can be replaced.

28. A method of changing filters in a continuous flow operation comprising the steps of:

filtering polymer flowing through a bore with a first filter assembly aligned with the bore, the first filter assembly being housed within a slide member which intersects the bore, the first filter assembly being proximate to a second filter assembly;

sealing around the first and second filter assemblies with a sealing surface on the slide member, the sealing surface bordering the first and second filter assemblies; and reciprocating the slide member to partially misalign the first filter assembly with the bore in order to expose the second filter assembly so that the second filter assembly can be replaced, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

29. The method of claim 28 further comprising the steps:

moving the slide member to partially misalign the first filter assembly with the bore and to partially align the second filter assembly with the bore so that a portion of each of the first and second filter assemblies is filtering polymer flowing in the bore; and further moving the slide member to move the first filter assembly off-line and the second filter assembly to be aligned with the bore to filter polymer with the second filter assembly.

30. The method of claim 29 further comprising the step of pre-filling the second filter assembly with polymer.

31. A method of changing filters in a continuous flow operation comprising the steps of;

filtering polymer flowing through a bore adjacent to a sealing region with a first filter assembly aligned with the bore, the first filter assembly being housed within a slide member, the first filter assembly being proximate to a second filter assembly;

sealing around the first and second filter assemblies with a sealing surface on the slide member, the sealing surface bordering the first and second filter assemblies and contacting the sealing region;

reciprocating the slide member to partially misalign the first filter assembly with the bore and to partially align the second filter assembly with eh bore so that a portion of each of the first and second filter assemblies is filtering polymer flowing in the bore;

moving the slide member to move the first filter assembly off-line and the second filter assembly to be aligned with the bore to filter polymer with the second filter assembly; and moving the slide member to partially misalign the second filter assembly with the bore to expose the first filter assembly beyond the sealing region, the first and second filter assemblies reciprocating back and forth into position with reciprocation of the slide member such that as the slide member moves in a first direction into position, the first and second filter assemblies move in said first direction into position in unison with the slide member, and as the slide member moves into position in a second direction opposite to the first direction, the first and second filter assemblies move in said second direction into position in unison with the slide member.

32. The method of claim 31 in which the first filter assembly and the second filter assembly each comprise at least one filter element, the method further comprising the steps of:

replacing the at least one filter element of the first filter assembly; and moving the second filter assembly back to be aligned with the bore to filter the polymer with the second filter assembly.

33. The method of claim 32 further comprising the step of pre-filling the second filter assembly with polymer.

* * * * *